Jan. 14, 1964
D. T. BARISH
3,117,630
ROTORS
Filed March 1, 1960
4 Sheets-Sheet 1
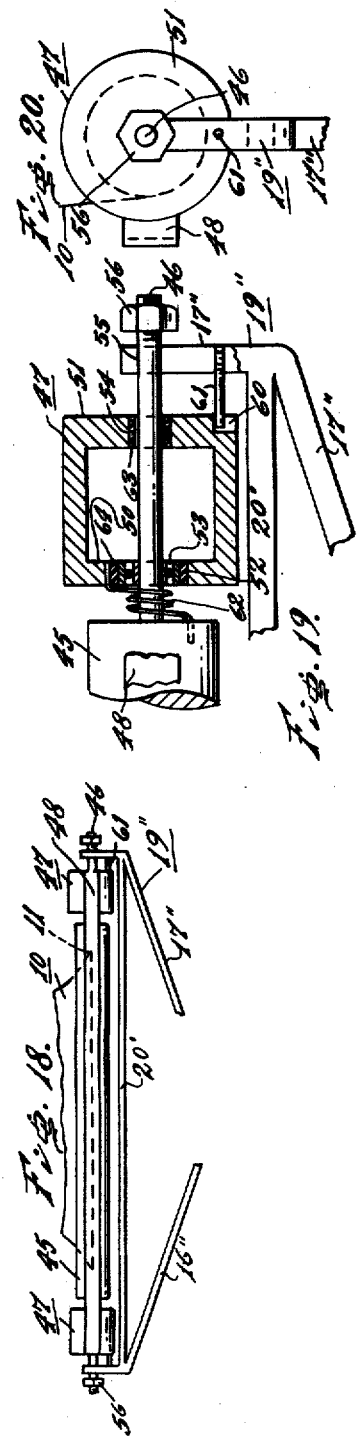
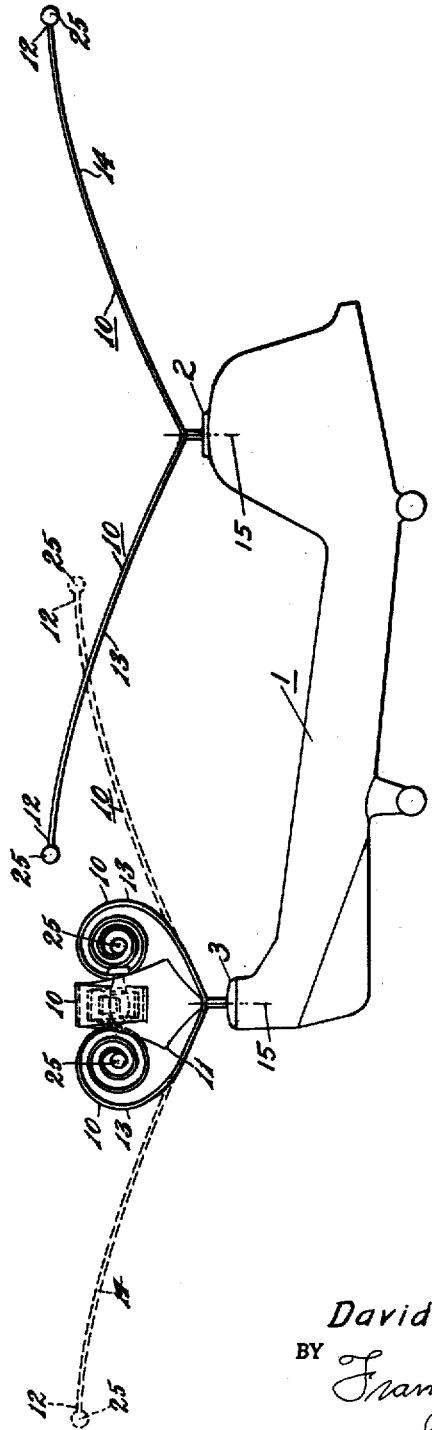
INVENTOR.
David T. Barish
BY
Frank H. Borden
Attorney

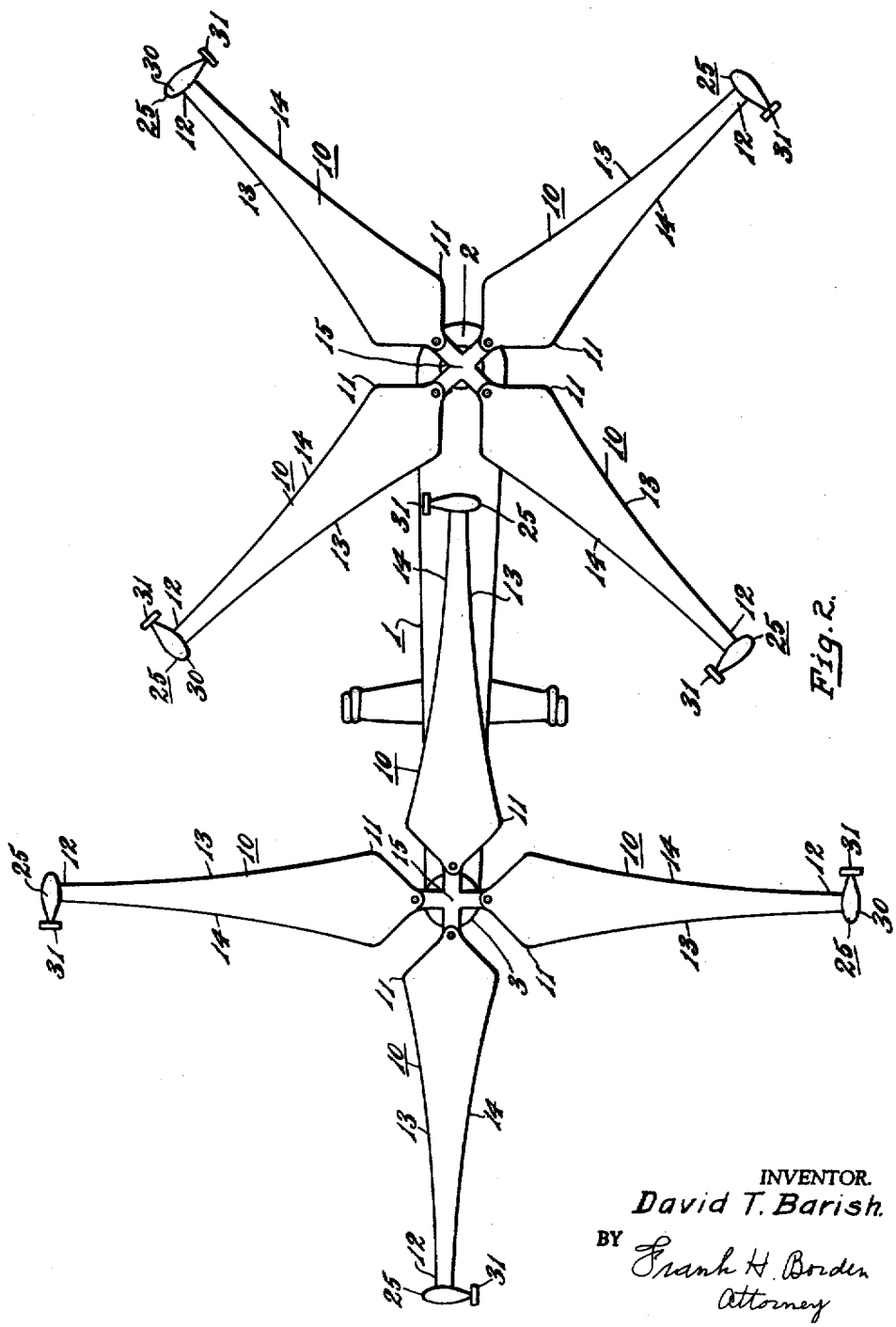

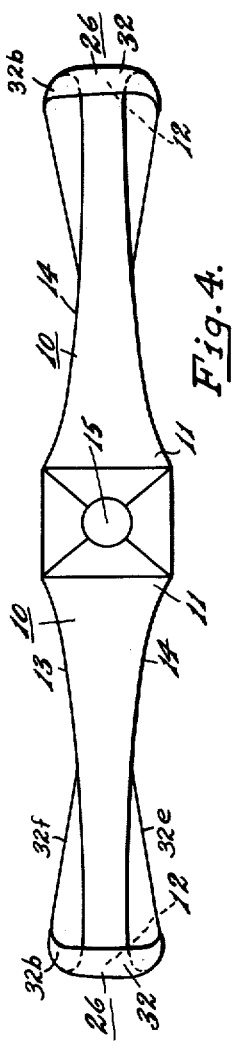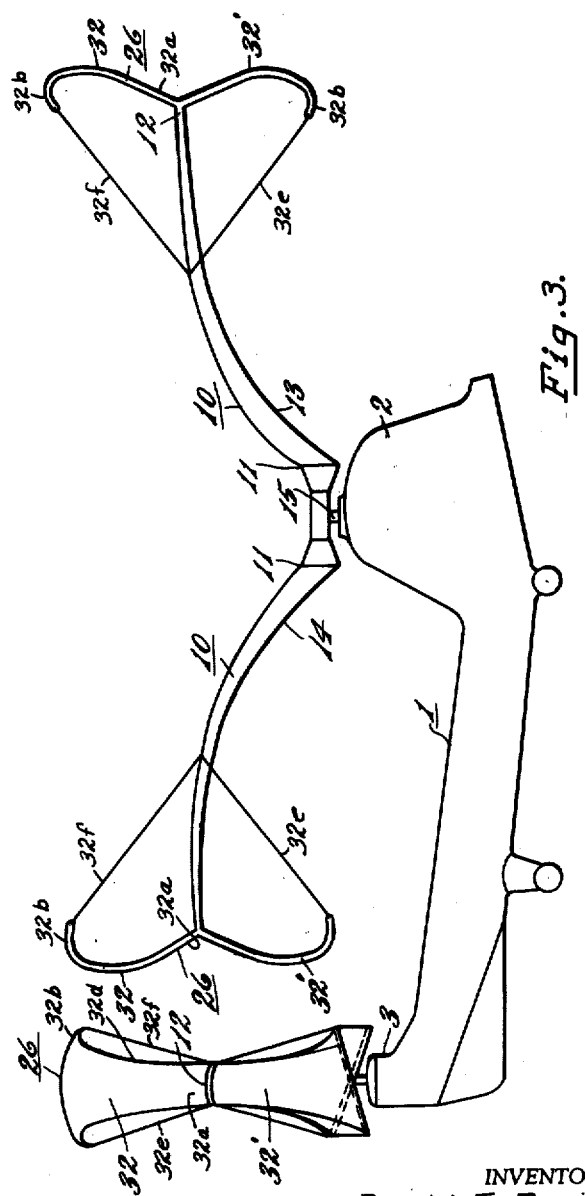

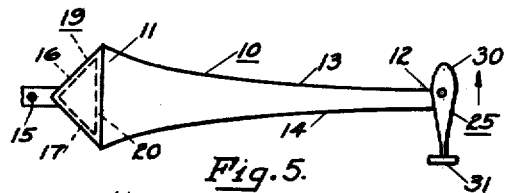
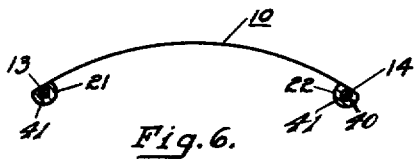
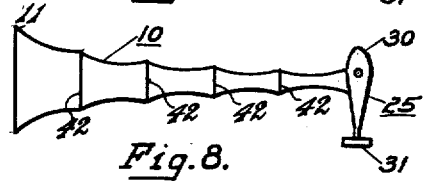
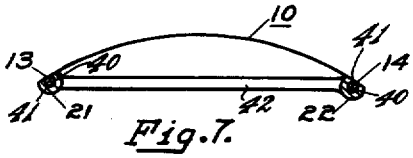
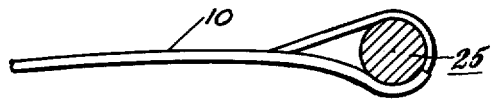
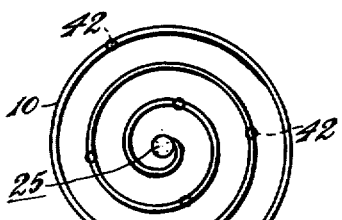
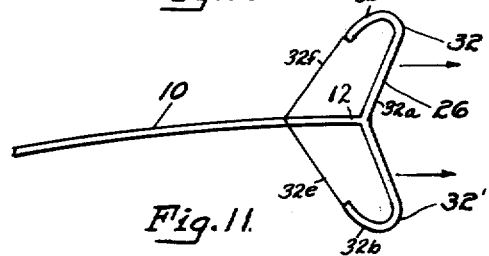
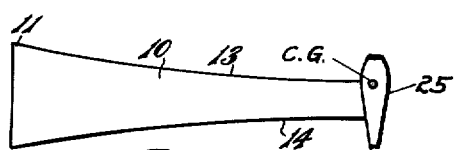
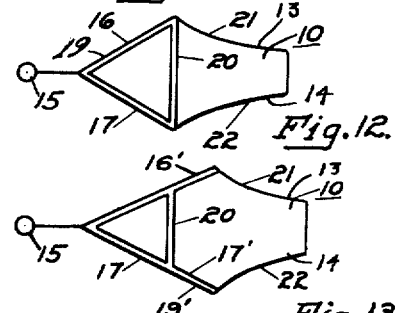
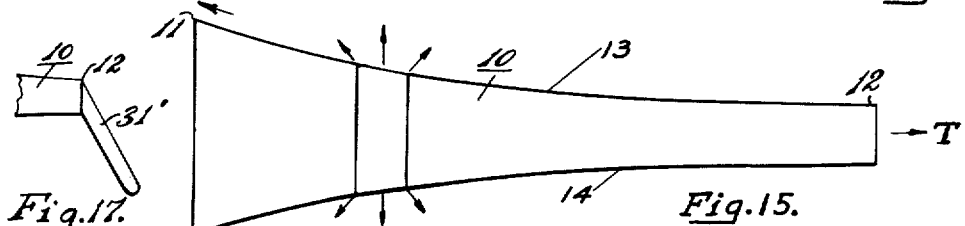
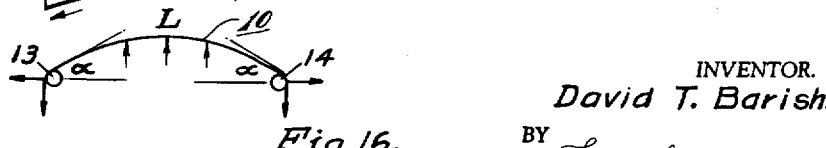
INVENTOR.
David T. Barish.

United States Patent Office 3,117,630
Patented Jan. 14, 1964

3,117,630
ROTORS
David T. Barish, New York, N.Y., assignor, by direct and mesne assignments, to Barish Associates, Inc., New York, N.Y., a corporation of New York
Filed Mar. 1, 1960, Ser. No. 12,011
27 Claims. (Cl. 170—160.11)

This invention relates to rotors, including rotary wing systems for helicopters, autogiros, convertaplanes and the like, and rotary blade systems as in propellers and the like.

For illustrative purposes the invention will be disclosed in connection with helicopters, and particularly with helicopters having two rotors mounted on a single fuselage. Of course it is also applicable to helicopters having single rotors.

Helicopter rotors as presently developed and used have disadvantageous features militating against optimum efficiency. One is the excessive weight of the rotor systems which sharply reduces the pay load. Another is that the downwash is not uniform along the blade but from the root at which the downwash is insignificant, the downwash increases in a sharp curve toward the tip. This is aerodynamically inefficient. They are presently limited in the blade maximum lift coefficient to about 1.5; in tip speeds to about 650 feet per second and in forward speeds to about 150 knots. There are so-called "dead man's zones" of flight where insufficient energy is stored in the rotor to effect a safe landing in the event of power failure.

It is among the objects of this invention: to improve rotor systems; to provide blading for rotor systems in which the downwash is substantially uniformly distributed along the blades; to reduce the weight of rotor systems; to increase the maximum lift coefficients, tip speeds, forward flight speeds and flight safety of rotor systems; to provide a rotor system composed of flexible membranes; to provide in a rotor system using flexible blade means exerting spanwise tension on the blades functional with rotative speed, with means for coiling the blades automatically upon themselves as endwise tension on the blades decreases, for stowage; to provide a rotor with a flexible blade which essentially is predetermined in curvatures for optimum lift/drag ratios; to provide rotor blades or blading which has substantially no residual bending nor torsional stiffness; to provide a rotor having blades which are flexible in two planes having no residual bending or torsional stiffness, in which stiffness under operating conditions is provided primarily by tension at the tip as a result of radial loading, either aerodynamic or centrifugal, or both; to provide a rotor having flexible blades markedly cambered in two planes functional with tension along concave edges of the blade and air pressure incident on the blades between the tension members; to provide a rotor having flexible blades in which stiffness under operating conditions is provided primarily by tension at the tip as a result of radial loading, either aerodynamic or centrifugal, or both, in which the radial loading element incorporates a propulsion unit; to provide a rotor with flexible blades with means for coiling or winding same; to provide a rotor blade which is extensible and retractable automatically in response to variations in spanwise tensions on the blade; to provide a rotor with a flexible blade having a stabilizing tip element to substantially maintain the angle of attack of the tip of the blade; to provide a flexible rotor blade with a sweptback tip control element stabilizing the blade despite the attainment of supersonic tip speeds; to provide a flexible blade with means for winding it from the root end, and to provide pressure relief for bearings through which spanwise tension loads are transmitted to the hub; and many other objects and advantages will become more apparent as the description proceeds.

In the accompanying drawings, forming part of this description:

FIG. 1 represents a schematic elevation of an illustrative helicopter having a fuselage mounting front and rear rotors according to the invention, with one rotor having its blades coiled for stowage and showing the extended attitude of these blades in dotted lines.

FIG. 2 represents a fragmentary plan of the helicopter of FIG. 1, showing the planform of the blades in extension and showing an illustrative form of the tip weights for exerting spanwise tension on the membraneous blades.

FIG. 3 represents a side elevation of a modified form of the helicopter of FIG. 1, with the tips of the blades mounting aerodynamic means for exerting spanwise tension on the blades.

FIG. 4 represents a plan of a rotor according to the organization of FIG. 3.

FIG. 5 represents a fairly schematic plan of a single blade of a rotor of FIG. 2, showing the root end anchoring truss.

FIG. 6 represents a chordwise section through the blade and the marginal tensioning members, in one illustrative organization of the latter.

FIG. 7 represents a similar chordwise section with a compression rib member extending between the lateral tensioning members of the blade.

FIG. 8 represents a plan of a blade mounting a series of spaced transverse compression rib members, and the more or less gentle scalloping effect produced thereby on the lateral margins.

FIG. 9 represents a schematic side elevation of a coiled blade, illustratively mounting a series of compression rib members, showing the spacing between turns, in a preferred structural embodiment, incident to differential tensions on such blade.

FIG. 10 represents a schematic fragmentary elevation of the tip of a blade and a mass mounted thereon for centrifugal tension spanwisely of the blade, showing an illustrative strap connected to the mass and the blade for tension control and proper rolling to coil the blade, as centrifugal force thereon decreases.

FIG. 11 represents a fragmentary elevation of the tip end of the rotor blade with the aerodynamic tensioning element thereon under inflation and with a lift vector radially outward of the blade.

FIGS. 12 and 13 represent fragmentary schematic views of the respective truss members by which the blades are attached to the mass axis.

FIG. 14 represents a fragmentary plan of the tip end of the blade showing a tip weight which also comprises a propulsion unit.

FIGS. 15 and 16 represent respectively a schematic plan and a schematic section of a blade showing the forces of the camber organization for optimum effectiveness.

FIG. 17 represents a fragmentary plan of a blade with a swept back tip element for stabilizing the blade while permitting tip speeds which are in the compressibility range.

FIGS. 18, 19 and 20 represent various fragmentary views of a rotatable blade mounting incorporating a spring actuated roller as the blade mounting and retracting element, with means for taking the radial tension loads of the blade in a direct mechanical couple substantially removing the pressures from the bearings supporting the roller.

In general the blading of the rotor system comprises a plurality of individual blades of special shaping and construction. Each blade is comprised of a tapered flexible membrane secured at its wider end to means rotatable about the axis of rotation of the rotor system and its outer free end or tip is secured to means for exerting radial tension thereon. The membrane has concave side edges and each edge is connected to a tensioning member extending between the means rotatable about the axis and the means for exerting radial tension. The tensioning members, by reason of their curvature, exert chordwise tension across the membrane and contribute to the contouring of the blade. When the blade is to coil from its outer end inward, a supplemental tensioning member is associated with the blade between its extremities above noted, whose moment is overbalanced by means exerting radial tension during deployment, but is such as to cause the blade to curl upward and then to coil or wind the blade upon itself with predetermined decrease in radial tension. The winding may be with adjacent courses in substantial contact, or in mutual spacing to minimize chafing and wear. Thus, with cessation of rotation each blade is curled or coiled or wound upon itself from the free end inward to a position generally adjacent to the axis of rotation. The winding may be from the inboard end, if desired, with juxtaposed courses in contact as will be described.

Referring to the drawings, a purely illustrative type of installation is disclosed in which the rotor, in duplicate, is used for sustentation of a helicopter. Referring to FIGS. 1 and 3, a fuselage 1, has front pylon 2 and a rear pylon 3. Each pylon mounts the usual controls and includes a rotatable mast member having an axis 15 about which the blading, to be described, is rotatable.

The basic structure of the blading according to the invention in an illustrative form comprises a flexible membrane or diaphragm 10, for each of the blades. As used herein the term "membrane" or "diaphragm" refers to a sheet which supports pressure loads primarily in tension. The flexible membrane is relatively wide at the root as at 11, and is relatively narrow at the tip, as at 12. Each membrane 10 is defined laterally by concave edges, respectively 13 as a leading edge and 14 as a trailing edge. Each blade has secured to the concave edges or margins, flexible tension members, respectively 21 at the leading edge 13, and 22 at the trailing edge 14. The wider root end 11 of the membraneous flexible blade 10 is secured to the mast member having the axis 15 by means of a truss unit or member 19 or 19'. Truss member 19 as shown, is illustratively a triangular unit having side members 16 and 17 converging in an apex secured to the mast member having the axis 15. The truss is completed by the compression member 20, and the apex formed by side member 16 and compression member 20 is connected to the tension member 21 of the leading edge 13. The remaining apex (the juncture of side member 17 and compression member 20), is connected to the trailing edge tension member 22. Truss member 19' is similar to member or unit 19, except that it may be formed like the letter A, with the side members 16 and 17 continued away from the pivotal axis 15 beyond the compression member 20, in arms respectively 16' and 17', with the respective tension members 21 and 22 attached to the respective extremities of the said arms.

The instant flexible membrane 10, having the thus inboardly anchored tension members 21 and 22 adjacent to the root of the blade, mounts at the tip end 12 thereof a tip member, to be described, to which the outer ends of the tension members 21 and 22 are anchored. The tip member is provided for effecting tension on the membrane 10 by the tension members 21 and 22. The tip members may take varying forms with varying functions, according to the characteristics desired with a given blading. The tip member may comprise a weight 25, for securing spanwise tension by centrifugal force, or it may comprise an aerodynamic lift member 26, the force vector of which is radially outward of the blade 10. The tip member may comprise a propulsive unit 25', as diagrammatically indicated in FIG. 14, where torque and tension on the blades are both to be secured. Finally the tip member may comprise the stiffened swept back continuation of the blade indicated at 31' of FIG. 17. This latter may attach to tip weights 25 or 25', or directly to the tip end 12 of each blade. In this case the swept back extension 31' may comprise the weight for tensioning the blade by centrifugal force. It will be seen that a tip member 31' comprises a stabilizer, having the advantages of a swept wing (higher tip Mach number), and an effective increase in rotor diameter. Any combinations of aerodynamic and centrifugal radial tensioning forces may be utilized.

It will be understood that each tension member 21 and 22 is under tension between the truss frame 19 or 19', at one end 11, anchored to the mast axis 15, and the tip member 25, 25', 26 or 31' at the other tip end 12. If tension member 21 at the leading edge of each membranous panel is under higher tension than is existent on tension member 22 at the trailing edge, it tends to effect aerodynamic stability by moving the center of pressure rearward of each respective membranous blade section 10.

An illustrative form of tip weight 25, may comprise an airfoil section 30, to which the tension members 21 and 22 and the tip end 12 of the blade membrane 10 are secured, and preferably mounting, downstream, a rotationally stabilizing vane 31. With this, again, for aerodynamic stability the center of gravity of the airfoil and vane combination is ahead of the mid point between the two edge tension members 21 and 22. By placement of the center of gravity of the tip element 25 ahead of the mid point between tension members more tension is applied at the leading edge 13 than at the trailing edge 14. This tends to flatten the leading edge camber and as a result moves the sectional center of pressure aft, with an enhanced stabilizing effect. By virtue of the decrease in incidence of the chords with increasing span, the flattened twist thus attained at the tip the blading simulates the so-called "ideal" hovering rotor which has the incidence inversely proportional to the radius and the chord inversely proportional to the radius. As shown in FIG. 14, the blade has a tip element 25' which comprises a reaction type of propulsion unit, with the effective center of gravity, as shown, forwardly ahead of the mid point between the edge tension members, for the same reasons that the center of gravity of tip weight 25 is also ahead of said mid point as previously explained.

While the illustrative aerodynamic lift member 26 has a centrifugal force due to its own, even small, mass, it is primarily a flexible airfoil 32, the lift vector of which is radially outward. Usually there will be at least two such airfoils 32 and 32'. In the purely illustrative case the airfoils 32 and 32' comprise a symmetrical pair. Considering airfoil 32 at one end of one blade 10 as illustrative, this comprises a diaphragmatic flexible blade having a relatively narrow inboard end 32a, connected to the blade end 12, and a relatively wide outboard marginal end 32b, connected by curved side edges 32c and 32d. Tension members 32e and 32f are joined to the respective curved edges 32c and 32d and extend from the outer margin 32b to the main blade panels 10. It will be seen that under deployment the force vector of the aerodynamic lift member 26 is generally radial of the main blade 10.

It will be understood that in the projected or extended condition of the membranous panel 10, with radial tensions on the curved edges of the panel provided primarily by radial loading (centrifugal and/or the radial component of the forces), the resulting blade is markedly cambered in two directions, to wit: in a plane containing the axis of rotation, and also in a plane perpendicular to that plane and parallel to the axis of rotation, and is also curved in planform with the edges concave outward. The main forces controlling the shaping being due to radial tensions in conjunction with concave edges, produce a chordwise tension distribution which controls the sectional camber and the radial tensions, which in conjunction with the spanwise camber produces a concave downward shaping. It may be noted that in the preferred embodiment the concave side edges 13 and 14 under tension of side tension members 21 and 22 effect a generally or slightly modified hyperbolic curve to the edges 13 and 14, between the tip unit 25 or 26 and the inboard side section 11 at its truss anchorage. These concavities are not necessarily identical curvatures.

It will be seen that in general the chordwise camber of the blading at any section is functional with the lift force on the instant membranous blade as opposed by the chordwise tension thereon produced by the concaved tension members.

In those cases where tip airfoils are disadvantageous, the radial force can be applied centrifugally by weights at the tip. This approach is particularly applicable to the cases where the profile losses must be kept down. As the tip speed increases the weight penalty involved decreases.

The cambered thin airfoil received considerable testing about 40 years ago. At the Reynolds numbers tested, they had lift/drag ratios which were superior to the present NACA symmetrical airfoils. The maximum lift/drag ratio of a 5% circularly cambered 3% thick flat airfoil is over 100. Data at higher values of Reynolds numbers are not presently available. The moment coefficient is practically invarient over a wide range of CL, particularly at the higher Reynolds numbers. The moment coefficient is the value $C_m$ about the quarter chord point.

The available membranous materials which may be preferred for use with the invention will now be discussed. In general the requirements for the material are that it be relatively imporous, generally as close to zero porosity as is consistent with the attainment of other requirements, and may comprise any textile fabric, coated or uncoated, any of the synthetic resins or sheet metal strips, fiber glass, or the like, provided it has proper and adequate flexibility. The flexibility of the material of the membrane can be as high as necessary, with a minimum dictated by stowage criteria. In other words the stiffness can go from zero to an upper limit determined by stowage criteria. It must be so flexible as to conduce to coiling with differential tensions. In general the material selected should be one that has substantially no residual bending resistance axially or spanwisely and substantially no shear resistance chordwise. The organization conduces to the use of a membrane having its greatest strength chordwise.

The description so far has dealt with the shaping and contouring of the blading. It is important to provide therewith resilient means or the like for automatically coiling each blade as rotation decreases. One method to achieve this end provides that each blade is associated with at least one coiling tension device extending between its tip and its root end and of sufficient overall effect as to cause coiling when the radial tension decreases. This may comprise a relatively thin coil spring connected to both ends of the membranous panel. For ease of stowage, it may be preferred to incorporate the coiling tension member with one or both of the primary tensioning members 21 and 22. Illustratively the lateral tension members 21 and 22 are each provided with a longitudinal groove 40, within which lies a coiling tension member 41. The center of tension of these members 21 and 22 is inward and downward of the edges 13 and 14 so that the center of tension of tension member 41 is outward and upward of that tension members 21 and 22.

As a result of being completely flexible, the blading, as described, has no droop strength. Droop strength refers to the bending stiffness of the blade preventing it from drooping when the centrifugal forces are removed. When the radial tension decreases with tip speed decrease, tension elements 41 effects a differential tension between itself and the lower tensioning member 21 or 22, resulting from a slight differential length or inherent resilience of the members, to cause a roll-up of the bladings as the rotational speed decreases. Purely for example the members 41 may comprise nylon cord, which is resiliently stretchable as compared with the members 21 and 22. As noted they may comprise coil springs. It will be understood that member 41 differs either in original unstressed length or elasticity from that of tension members 21 or 22. It will be further understood that although the primary tension members 21 and 22 may have an axial groove or recess 40 to receive the coiling member, this is not important, as guide rails, clips or tubes may be used for the association of the member 41 with the instant blade. As it is preferred that the blade be coiled upwardly in general, it is preferred that the effective tension line 41 be above the instant primary tension members 21 or 22. It will also be clear that it is not essential that there be more than one coiling tension member 41 associated with each blade.

It will be noted that if the transverse or chordwise tension, established by the marginal tension members 21 and 22, is not high enough it tends to bring the tension members laterally together and thus to establish too high a chordwise camber in the panel or membrane 10. To flatten the camber and to bring the blade into more efficient aerodynamic functioning, one or more chordwise compression members 42 may be provided extending between the tension members 21 and 22, or the marginal edges of the membranous panel 10. While these may effect a slightly scalloped effect on the margins of the blade, this is inconsequential aerodynamically compared to the effect of proper chordwise camber of the various chordwise sections along the longitudinal extent of the blades. With the coiling incident to the described differential tensions as illustrated in FIGS. 1 and 9, the coiling of the blade finds each turn thereof out of contact with the turn inwardly thereof, which minimizes chafing and wear on the panels as they are successively extended and retracted in relative use and non-use of the rotor system.

Power is delivered to the blading through any desired mode, an illustrative one of which is the conventional lead-lag hub, which is attached to a member which distributes the forces to the two edge members 21 and 22 of each blade. The differential tensions in the edge members provide the moment for driving the blades in rotation about the hub or mast axis 15. It may be preferred to use tip elements 25' as the propulsion for the blades.

Torsional stiffness is provided primarily by the radial forces and the stability at the tip. As a result the control system differs slightly from conventional systems. An incidence change at the root produces varying incidence along the blade, depending in degree upon the torsional rigidity produced by the pitch stabilization at the tip. There is, compared to a rigid blade, more incidence near the root than toward the tip. As a result the spanwise control lift distribution has its centroid closer to the hub, thus the overturning moment per unit lift is lower and the flapping less. In forward flight several advantages accrue to the rotor. By virtue of being of minimum thickness and roughly uniform chordwise pressure distribution the critical Mach number at which shock waves form is a maximum. This general type of blading has a very wide range of lift coefficients with negligible shifting of the center of pressure, thus control moments can be minimized. The stabilization of the tip has the further advantage of distributing the incidence angles in a most advantageous manner. The range of angles of attack of the tip sections is kept within useable controlled limits. It follows that the downwash is fairly uniform along the blade and at any section is less than the maximum of a conventional rotor blade.

While for several reasons uncoiling and coiling from the tip is usually preferred, as by the differential tension illustrated, it will be obvious that any other uncoiling in response to increase of radial tension, and coiling in automatic response to reduction of radial tension can be utilized, also the coiling can be from the root end of the blade.

Referring to FIGS. 18, 19 and 20 an illustrative coiling and uncoiling organization, operative on the root end of the blade, is disclosed. In essence this operates upon the principle of the conventional shade roller, normally, but not essentially, without the latching usually associated with such rollers. A drum or roller 45 is mounted on an axle or spindle 46 for rotation therewith. A supporting frame 47 is provided, comprising a connecting strip 48 having at both ends a pair of spaced parallel, apertured cheeks, comprised of an inner raceway cheek 50 and an outer abutment cheek 51. The race-way cheek 50 is apertured at 52 and mounts a ball race 53 through which the axle 46 extends for antifriction rotation relative to the frame 47. The outer cheek 51 is apertured at 54 and axle 46 extends through and beyond aperture 54, with a slight clearance radially from the surface of aperture 54. Anchored to the outer surface of the drum 45 at at least the chordwisely spaced extremities of the inboard end 11, is a blade 10, constructed as previously described. The blade in retraction is wound on the drum, and in extension is anchored to the then stationary drum at the inner ends of tension members 21 and 22.

A modified form of truss 19″, or the like, is provided, comprising legs 16″ and 17″ and compression member 20′. The apex of the legs is for connection to the rotor hub at the axis 15. The legs 16″ and 17″ are apertured toward the ends, as at 55, for receiving and permitting relative rotation of axle 46 extending therethrough and beyond. An anchoring nut or the like 56 is disposed on the extremities of axle 46. It is desired that the frame 47 and the truss 19″ be held against relative angular motion about the axis of axle 46. This may be achieved by any desired means. Purely for illustration cheek 51 is provided externally with a radial groove 60 into which extends a pin 61 mounted on the inner surface of leg 17″. A torsion spring extends between the axle or the roller and a relatively fixed portion of the assembly, in any desired manner. This is disclosed in a purely illustrative, more or less schematic manner, by a spring 62, surrounding axle 46, and anchored at one end to cheek 50 and at the other to drum 45. Actually, in construction, of course the spring will be of adequate length and strength as, when fully loaded, to rotate through enough turns as to wind up the blade on the drum.

In the normal operation with the blade wound upon the drum, it is stowed and stationary, and as the rotor is started in rotation the spanwise tension on the blade tip begins to increase, forcing the drum to rotate and pay out the blade, while increasing the loading of the torsion return spring 62.

It will be evident that the spanwise tension loads, will probably continue to increase after the blade has been fully paid out by the drum, with acceleration of rotation of the rotor of which the blade is a part.

In any case it will be evident that the tension loads are carried to the hub at axis 15, through the drum to the axle through the bearing 53 into frame 47 and into truss 19″.

As the increased force between axle 46 and truss arm 17″ in one sense is opposed by increased force from the periphery of drum 45 in the other sense, a pressure load is developed on bearing 53, which, if unrelieved might adversely affect the bearing, as by crushing same, or the like. It is preferred that the aperture 54 in abutment cheek 51 have a brake lining 63, or the like, having slight radial clearance from axle 46 so that, in one instance, the excess pressure loads flex the axle 46 with relation to bearing 53, bringing the axle into rigid abutment with the brake lining 63, or the surface of aperture 54, and taking the excess loads off of bearing 53 and preserving the bearing. As a modification of this structure, in order to still further minimize crushing pressures on bearing 53, and avoidance of excessive flexing of the axle, a resilient liner 64 is mounted between bearing 53 and the surface of aperture 54. As excess loads develop, pressure on the bearing 53 distorts the resilient lining 64 sufficiently to permit the axle to become eccentric as the axle establishes its rigid inter engagement with cheek 51.

I claim as my invention:

1. A rotor system comprising a blade comprising a flexible diaphragmatic blade element having concave lateral edges leading from a relatively wide inboard root end to a relatively narrow outboard tip end, flexible tension members secured to the blade element adjacent to and conforming to the respective concave edges, said element having substantially no residual bending resistance either spanwisely or chordwisely between said tension members, a tip member to which the respective tension members are anchored at one end developing spanwise tension therein and mounting means to which the tension members are mounted at the root end and absorbing spanwise tension on said tension members wherein the chordwise camber of the blade is functional with tension and loading of the blade.

2. A rotor system as in claim 1, and a chordwise compression member connected to and between the respective tension members and out of direct shaping connection with said blade element.

3. A rotor system as in claim 1, in which the tip member has an effective center of gravity closer to one tension member than to the other and determines the angle of incidence of the blade adjacent to the tip.

4. A rotor system as in claim 1, in which the tip element comprises a swept-back stabilizing surface angularly extending outwardly and rearwardly relative to said blade.

5. A rotor system as in claim 1, said blade being susceptible to winding from one end from an extended position, and means winding said blade automatically from its said one end functionally with decrease of radial tension on said tension members.

6. A rotor system as in claim 1, said blade being susceptible to uncoiling from a coiled position from one end, and means operative functional with increasing tension on said tension members effecting uncoiling of said blade.

7. A rotor system as in claim 1, in which the mounting means incorporates a rotatable drum to which the tension members are attached, resilient means rotating said drum and winding up said blade on said drum with decreasing tension on said tension members.

8. A rotor system as in claim 7, and an axle for said drum, a frame having first and second spaced cheeks through which the axle extends, a bearing in the first cheek journalling said axle, an aperture in said cheek through which the axle extends said mounting means incorporating a member engaging said axle beyond the second cheek, said axle moving against said second cheek and precluding excessive pressure on said bearing under relatively heavy loads.

9. A blade as in claim 1, in which the concave edges establish monotonically decreasing chord from a maximum chord from toward the root toward the tip of said blade.

10. A rotor system as in claim 1 in which differential tensions are exerted on the tension members with more tension on the leading edge of the blade whereby the center of pressure of the blade is forced behind the center of gravity of said blade to provide aerodynamic stability for said blade.

11. A rotor system as in claim 1, in which the tip member is primarily an aerodynamic element of substantially constant force at constant blade speed.

12. A rotor system as in claim 2 in which said compression member is one of a plurality of compression members spanwisely spaced along said blade, and the respective compression members along with varying edge curvature determine the chordwise camber distribution.

13. A rotor system as in claim 2, in which the compression member is one of a plurality and each of said plurality are spanwisely spaced to effect spacing between all contiguous turns of the coils of the blade, and means for coiling the blade from its outboard tip with decrease of the radial tension thereon.

14. A rotor system as in claim 1, and a coil spring disposed generally adjacent to a spanwise tension member and spaced from the elastic axis thereof whereby in the uncoiled condition differential tensions between the spring and said tension member produce a couple tending to coil the blade for radially coiling the blade as the tension on the flexible tension members decreases.

15. A rotor system as in claim 1, and an auxiliary tensioned member associated with one of said tension members and spaced from the elastic axis thereof whereby in the uncoiled condition differential tensions between said auxiliary and said tension member produce a couple tending to coil the blade for radially coiling the blade as the spanwise tension on the tension members decreases.

16. A rotor system as in claim 15, in which said auxiliary tension member has its center of tension above the center of tension of the tension member with which it is associated.

17. A rotor system as in claim 16, in which the tension member attached to the blade has a longitudinal groove, and in which the auxiliary tensioned member is disposed in said groove.

18. A rotor system as in claim 1, in which said tip member is attached at one side to the blade and at the other side by a strap connected to said blade inboard of said tip facilitating coiling.

19. A rotor system as in claim 1, in which the diaphragmatic blade element has the tensile fibers oriented essentially chordwise.

20. A rotor system as in claim 1, in which the diaphragmatic blade element has differential strength chordwise and spanwise, with the greater strength extending chordwise.

21. A rotor system having an axis of rotation, comprising a blade having a root and a tip, said blade comprised of a flexible membrane wider at the root than at the tip and having lateral concave edges conforming generally to hyperbolic curves, and respectively comprising leading and trailing edges and tension members on and conforming to the respective concave edges, means connecting the respective tension members at the root end of the blade to such axis, means at the tip end of the blade developing tension on the blade, having a resultant vector on the blade closer to the leading edge than to the trailing edge.

22. A rotor system as in claim 21, in which the incidence of the blade is inversely proportional to the radius.

23. A rotor system as in claim 1 and a compression member extending between the tension members out of shaping contact with the flexible element modifying the tension and thus the chordwise camber adjacent to the compression member under the loading.

24. A rotor system as in claim 1, and means coiling said blade from its outboard tip end with decrease of the spanwise tension of said tension members.

25. A rotor system as in claim 1, and a pitch stabilizing airfoil attached to said tip member, the main portion at least of said airfoil located downstream of the center of gravity of said tip member.

26. A rotor system as in claim 1, in which the mounting means comprises a rigid generally planar structural frame essentially triangular in form mounted for rotation about the axis of the rotor system at one apex with the tension members respectively connected to the respective other apices of the frame.

27. A rotor system comprising a blade wider at the root than at the tip and having leading and trailing edges, a first generally spanwise flexible tension member attached to said blade closer to said leading edge than to said trailing edge and curved to form a concavity presenting away from said trailing edge, a second flexible tension member attached to said blade closer to said trailing edge than to said leading edge curved to form a concavity presenting away from said leading edge, said tension members having chordwise spacing wider at the root than at the tip, said blade between attachments to said respective tension members comprising a flexible diaphragmatic element having substantially no residual bending resistance at least chordwisely between the tension members, tip means to which the respective tension members are secured developing spanwise tension on said curved tension members in flight tending to reduce the curvatures thereof and thereby establishing chordwise tension on said flexible element, mounting means for the root ends of said flexible tension members, wherein chordwise camber of the flexible element is functional with tension and loading of the blade.

References Cited in the file of this patent

UNITED STATES PATENTS

| | | |
|---|---|---|
| 1,718,577 | Pitcairn | June 25, 1929 |
| 2,172,333 | Theodorsen | Sept. 5, 1939 |
| 2,226,978 | Pescara | Dec. 31, 1940 |
| 2,364,496 | Vogel | Dec. 5, 1944 |
| 2,475,121 | Avery | July 5, 1949 |
| 2,614,636 | Prewitt | Oct. 21, 1952 |
| 2,616,509 | Thomas | Nov. 4, 1952 |
| 2,717,043 | Isacco | Sept. 6, 1955 |
| 2,996,121 | Stub | Aug. 15, 1961 |

OTHER REFERENCES

NACA TN 1604 "Standard Symbols for Helicopters," June 1948.